United States Patent [19]

Nel

[11] Patent Number: 5,688,477
[45] Date of Patent: Nov. 18, 1997

[54] PROCESS FOR REACTING DISSOCIATED ZIRCON WITH GASEOUS HYDROGEN FLUORIDE

[75] Inventor: Jonathan Nel, Verwoerdburg, South Africa

[73] Assignee: Atomic Energy Corporation of South Africa Limited, Pelindaba, South Africa

[21] Appl. No.: 377,425

[22] Filed: Jan. 24, 1995

[30] Foreign Application Priority Data

Jan. 31, 1994 [ZA] South Africa .................... 94/0649

[51] Int. Cl.$^6$ .................... C01G 25/00; C01B 9/08; C01B 11/00; C01B 33/08
[52] U.S. Cl. .................... 423/82; 423/489; 423/608; 423/472; 423/341
[58] Field of Search .................... 423/69, 82, 492, 423/75, 76, 489, 341, 608, 472

[56] References Cited

U.S. PATENT DOCUMENTS

| | | | |
|---|---|---|---|
| 1,535,687 | 4/1925 | Ruff | 423/73 |
| 2,076,080 | 4/1937 | George et al. | 423/75 |
| 2,972,515 | 2/1961 | Mockrin | 423/489 |
| 3,233,969 | 2/1966 | Heller et al. | 23/182 |
| 3,674,431 | 7/1972 | Driscoll et al. | 423/341 |
| 4,047,970 | 9/1977 | Morriss et al. | 106/451 |
| 4,053,320 | 10/1977 | Williamson et al. | 501/103 |
| 4,746,497 | 5/1988 | Jenkins et al. | 423/69 |
| 4,840,774 | 6/1989 | Campbell et al. | 423/69 |

FOREIGN PATENT DOCUMENTS

| | | | |
|---|---|---|---|
| 936 331 | 6/1973 | Canada . | |
| 762 055 | 3/1934 | France . | |
| 85/5356 | 7/1985 | South Africa . | |
| 450053 | 7/1936 | United Kingdom | 423/69 |

OTHER PUBLICATIONS

Blumenthal, The Chemical Behavior of Zirconium, pp. 138–139, 1958, no month.

Van Haagen, et al, J. Amer. Chem. Soc., vol. 33, Part 2, pp. 1504–1506, 1911, no month.

M. Robinson, "Preparation and Purification of Fluoride Glass Starting Materials", *Materials Science Forum* vol. 5 (1985), pp. 19–34, no month.

*Primary Examiner*—Steven Bos
*Attorney, Agent, or Firm*—Marshall, O'Toole, Gerstein, Murray & Borun

[57] ABSTRACT

A process for treating dissociated zircon comprises reacting dissociated zircon with gaseous hydrogen fluoride at an elevated reaction temperature. The reaction temperature is controlled to obtain at least one desired zirconium-based compound and at least one desired silicon-based compound.

24 Claims, 6 Drawing Sheets

PROCESS FOR REACTING DISSOCIATED ZIRCON WITH GASEOUS HYDROGEN FLUORIDE

FIELD OF THE INVENTION

THIS INVENTION relates to the treatment of a chemical. It relates in particular to a process for treating dissociated zircon ('DZ').

SUMMARY OF THE INVENTION

According to the invention, there is provided a process for treating dissociated zircon which comprises reacting dissociated zircon with gaseous hydrogen fluoride at an elevated reaction temperature, and controlling the reaction temperature to obtain at least one desired zirconium-based compound and at least one desired silicon-based compound.

By 'dissociated zircon' or 'DZ' is meant $ZrO_2.SiO_2$, and can either be fully dissociated zircon which contains substantially no undissociated zircon, or partly dissociated zircon which thus contains some undissociated zircon.

The dissociated zircon can be that obtainable by any suitable process. Thus, for example, it can be that obtained by destroying the crystal matrix of zircon, $ZrSiO_4$, by heating it to high temperature in a plasma furnace or plasma generator. Plasma dissociated zircon ('PDZ') particles consist of an intimate mixture of a sub-micron zirconia phase, cemented together by an amorphous glassy silica phase.

The desired zirconium-based and silicon-based compounds will thus primarily be fluorides and/or oxides of zirconium and silicon, with the composition of the compounds and their purity being dictated primarily by the reaction temperature. At relatively low reaction temperatures, typically in the region of about 50° C. at atmospheric pressure, zirconia, $ZrO_2$ is formed and absorbs hydrogen fluoride, so that relatively impure zirconia is thus obtained together with gaseous silicon tetrafluoride, $SiF_4$; at higher temperatures, typically in the region of about 100° C., relatively pure zirconia containing little or no absorbed hydrogen fluoride and gaseous silicon tetrafluoride are obtained; at still higher reaction temperatures, typically in the region of about 150° C., zirconium oxyfluorides rather than zirconia, and gaseous silicon tetrafluoride are formed; at still higher temperatures, typically in the region of about 400° C. to about 550° C., a mixture of zirconium tetrafluoride and zirconium oxyfluorides is primarily formed, together with gaseous silicon tetrafluoride. The reaction temperature is thus, importantly, selected to give a desired product composition and purity.

In one embodiment of the invention, the reaction temperature may be moderately low so as to obtain, as the zirconium-based compound, zirconia, optionally containing unreacted zircon, zirconium tetrafluoride and/or zirconium oxyfluorides and some absorbed hydrogen fluoride, and, as the silicon-based compound, gaseous silicon tetrafluoride, produced by reaction of hydrogen fluoride and silica, $SiO_2$ at the reaction temperature. Typically, the reaction temperature may then be controlled at between 50° C. and 150° C., for example between 90° C. and 130° C.

The process may then include withdrawing the silicon tetrafluoride as a gaseous stream, with the other components remaining as a residual solid phase.

The residual solid phase may be treated further by passing steam at a temperature above 500° C. therethrough, to release hydrogen fluoride from the zirconia, and to convert any zirconium tetrafluoride and/or fluorides of some impurities such as iron, to zirconia and the respective oxides. Instead, the residual solid phase can be substantially defluorinated by means of acid or water washing.

The various reactions and process steps may typically be effected in one or more fluidized beds or other suitable contacting apparatus such as a rotary kiln, and the process may be a batch or continuous process. The apparatus, especially when used for desilication, can typically be fitted with heat exchanger tubes to dissipate the heat of reaction. The temperature of the cooling medium used must then be such that condensation of the gaseous phase does not occur to an appreciable extent.

The silicon tetrafluoride may be reacted with steam at elevated temperature to yield silica and hydrogen fluoride. The hydrogen fluoride may be treated to render it into gaseous form, and recycled for reuse in the reaction with dissociated zircon.

However, the silicon tetrafluoride may instead be reacted in a gas or plasma flame to yield waste or fumed silica with the liberation of hydrogen fluoride. When a gas flame is used, it may typically be a methane or hydrogen flame, which are known in the art. Since flow rates of silicon tetrafluoride are not constant when the process operates on a batch basis, the silicon tetrafluoride may be dissolved in water, and the aqueous solution fed to burners generating the flame.

The hydrogen fluoride thus liberated or produced will contain water vapour, and may be condensed or scrubbed with water. The hydrogen fluoride may then be concentrated for re-use. Concentrating the hydrogen fluoride up to not higher than 35% facilitates distillation thereof, but large volumes of water are recirculated, making the process energy intensive. Instead, the hydrogen fluoride solution may be distilled azeotropically using known techniques, or concentrated by means of concentrated sulphuric acid, or other suitable means.

The process may also include, in respect of the residual solid phase, separating any unreacted zircon from the zirconia, and subjecting the zirconia to acid or base leaching to improve its quality. The separation may be effected by means of flotation, spiral separation, table separation, heavy media separation or any other suitable solid/solid separation technique. Base leaching will be particularly beneficial in reducing any residual silica. During leaching, the residual agglomerated zirconia is attritioned to the constituent sub-micron crystallites. This phenomenon greatly facilitates the separation of the zirconia from any undissociated zircon. The resultant fine powdered zirconia is, in most cases, beneficial since downstream milling operations are thereby avoided. For the acid leaching, any suitable technique such as that used for baddeleyite, can be used. The acid will be selected according to the impurity which it is desired to remove. Thus, to remove uranium or thorium impurities, nitric acid may be used; to remove other impurities, mixed acids will be used. Milling will improve leaching efficiency.

The resultant zirconia product will still, however, be relatively impure in view thereof that only silica is removed initially.

In another embodiment of the invention, a relatively high reaction temperature, e.g. between 400° C. and 550° C., may be used, so as to obtain, as the zirconium-based compounds, a mixture of zirconium tetrafluoride and zirconium oxyfluorides, and, as the silica-based compound, gaseous silicon tetrafluoride.

Again, the reaction may be effected in at least one solids-gas contactor such as a fluidized bed, and the process may be batch or continuous.

The process may then, as before, include withdrawing the silicon tetrafluoride as a gaseous stream, with the other components remaining as a residual solid phase.

The silicon tetrafluoride may then be reacted further, as hereinbefore described.

The process may include heating the residual solid phase to a temperature above 600° C., to obtain a sublimate products phase comprising mainly sublimated zirconium tetrafluoride, and a residual solids fraction comprising unreacted zirconia, some zirconium oxyfluorides and most of the impurities. To improve the quality of the zirconia subsequently obtained as hereinafter described, the sublimate products phase can be desublimated, and thereafter again heated to a temperature above 600° C. to resublimate it, to obtain greater purity zirconium tetrafluoride. This will separate the zirconium tetrafluoride from residual non-sublimated impurities. These desublimation/resublimation steps can be effected more than once, if desired.

The process may include treating the residual solids fraction with steam at an elevated temperature above 500° C. to produce relatively crude zirconia.

The zirconia and oxyfluorides remaining in the residual solids fraction after the first or initial sublimation of the zirconium tetrafluoride should be substantially free of impurities which sublimate easily along with the zirconium tetrafluoride. Thus, instead of treating the residual solids fraction with steam as hereinbefore described, the process may include again reacting the residual solids fraction with gaseous hydrogen fluoride, and thereafter heating the solids fraction to a temperature above 600° C., to sublimate any zirconium tetrafluoride which has formed, with the resultant zirconium tetrafluoride being of higher quality, i.e. higher purity.

In one embodiment of the invention, the process may include initially raising the temperature of the residual solid phase, to less than 600° C. at atmospheric pressure, so that impurities present therein are pre-sublimated; thereafter, withdrawing the sublimated impurities; and then heating the residual solid phase to the temperature above 600° C., to obtain the sublimate products phase comprising mainly relatively high purity sublimated zirconium tetrafluoride. Condensing the zirconium tetrafluoride at temperatures slightly below the sublimation point instead of at room temperature should further improve the quality of the resultant product.

In one version of the invention, the heating of the residual solid phase and/or the sublimate products phase to the temperature above 600° C. may be effected under vacuum. Optimally, this may be effected at an absolute pressure between the vapour pressure of zirconium tetrafluoride and the vapour pressures of any impurity fluorides present. Furthermore, product quality is enhanced if sublimation is only effected for the minimum period of time required to sublimate substantially all the zirconium tetrafluoride, i.e. if no excess time is used for sublimation.

However, in another version of the invention, the heating of the residual solid phase and/or the sublimate products phase to the temperature above 600° C. may be effected at normal or positive pressures, for example atmospheric pressure. The sublimated products can then be swept away with a carrier gas. The heating may then be effected in a solids-gas contactor, e.g. in a fluidized bed, which may operate at substantially atmospheric pressure. Nitrogen or air can then be used as the carrier gas or fluidization medium, with sublimated zirconium tetrafluoride and the carrier gas or fluidization medium passing upwardly out of the contactor or the bed.

The resultant zirconium tetrafluoride, in vapour or solid phase, may be reacted with steam at a temperature above 500° C. to produce relatively pure zirconia.

In one embodiment of the invention, the reaction of the zirconium tetrafluoride with the steam may be effected in a rotating furnace, in a gas flame, or in a plasma flame.

Instead, an upper section of a vessel housing the fluidized bed may be equipped with a nozzle, through which the steam can enter the vessel, so that the zirconium tetrafluoride containing carrier gas which passes upwardly from the bed, can be intimately admixed with steam, thus avoiding the need for a desublimator. In yet another version, the upper section of the vessel housing the fluidized bed may contain a fluidized medium, such as particulate zirconia, on top of a steam distributor-bed support, with the carrier gas and steam from the steam distributor acting as fluidizing medium for the particulate zirconia.

The invention will now be described by way of example with reference to the accompanying drawings.

DETAILED DESCRIPTION OF THE PREFERRED EMBODIMENTS

Figure 1:
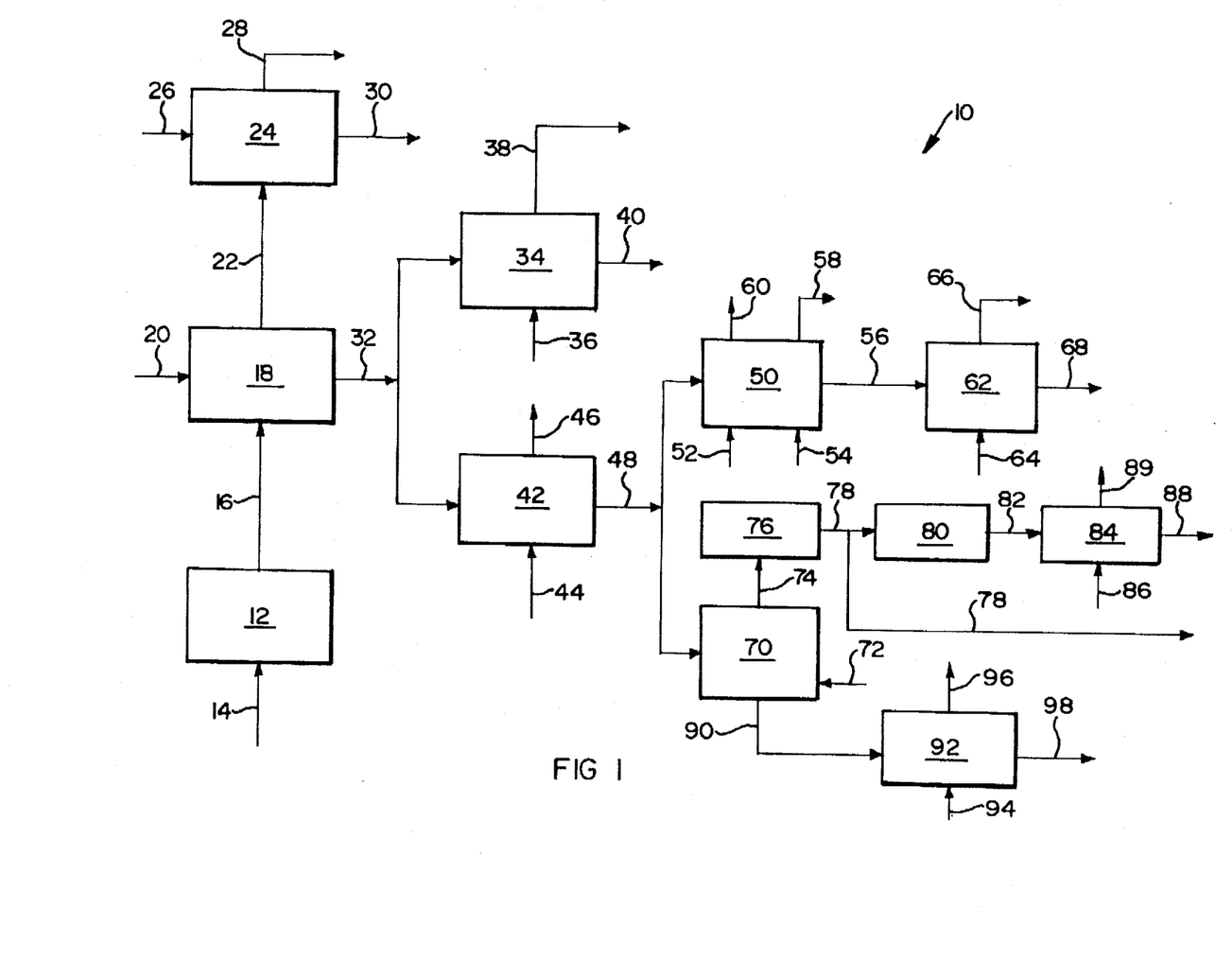
FIG. 1 shows a simplified flow diagram of a postulated process for treating dissociated zircon, according to the invention.

Referring to FIG. 1, reference numeral 10 generally indicates a process for treating dissociated zircon according to the invention.

The process 10 includes a dissociated zircon production stage 12 with a zircon feedline 14 leading into the stage 12. The stage 12 is typically an in flight plasma reactor in which zircon can be heated to temperatures in excess of 1700° C.

A dissociated zircon ("DZ") transfer line 16 leads from the stage 12 to a solids-gas contacting stage 18. The stage 18 is typically a fluidized bed or rotating kiln. A gaseous hydrogen fluoride ('HF') feedline 20 leads into the stage 18.

A gaseous product feedline 22 leads from the stage 18 to a defluorination stage 24. A steam feedline 26 leads into the stage 24, while a silica withdrawal line 28 and a HF withdrawal line 30 lead from the stage 24. Typically, the stage 24 comprises a plasma or a flame reactor.

An unreacted zirconia transfer line 32 leads from the stage 18 to a desorbing stage 34. A water, acid or steam feedline 36 leads into the stage 34, while an HF withdrawal line 38 leads from the stage 34. A zirconia withdrawal line 40 also leads from the stage 34. Typically, the stage 34 is a solids-gas contactor such as a fluidized bed, a rotary kiln, or a typical solids-solution contactor.

Instead, the flow line 32 can lead to a fluorination stage 42, with an HF feedline 44 also leading into the stage 42. A water vapour withdrawal line 46 leads from the stage 42, as does a zirconium compound withdrawal line 48. Typically, the stage 42 comprises a solids-gas contactor such as a fluidized bed or a rotary kiln.

The flow line 48 leads to a sublimation-reaction stage 50. An air feedline 52 leads into the stage 50, as does a steam flow line 54. An oxyfluoride withdrawal line 56 leads from the stage 50, as do a zirconia withdrawal line 58 and a HF withdrawal line 60. Typically, the stage 50 comprises a solids-gas contactor such as a fluidized bed or a rotary kiln.

The flow line 56 passes to a defluorination stage 62, with a steam flow line 64 leading into the stage 62. A zirconia withdrawal line 66 leads from the stage 62, as does an HF withdrawal line 68. Typically, the stage 62 can comprise a solids-gas contactor such as a fluidized bed or a rotary kiln.

Instead, the flow line 48 can lead to a dynamic sublimation stage 70. The stage 70 typically comprises a solids-gas contactor, and an air flow line 72 leads into the stage 70. A zirconium tetrafluoride withdrawal line 74 leads from the stage 70 to a desublimation stage 76. A zirconium tetrafluoride withdrawal line 78 leads from the stage 76.

The flow line 78 can, if desired, lead to a vacuum sublimation/desublimation stage 80, with a high purity zirconium tetrafluoride withdrawal line 82 leading from the stage 80. The stage 80 typically comprises a pressure vessel mounted inside a furnace, and fitted with an internal or external vapour condensing device.

The flow line 82 leads to a defluorination stage 84, with a steam flow line 86 leading into the stage 84. A high purity zirconia withdrawal line 88, as well as a HF withdrawal line 89, lead from the stage 84. The stage can typically comprise a fluidized bed, optionally fitted with a steam nozzle, a rotary kiln or the like.

An unreacted zirconia withdrawal line 90 leads from the stage 70 to a defluorination stage 92, with a steam flow line 94 leading into the stage 92. A HF withdrawal line 96 leads from the stage 92, as does a zirconia withdrawal line 98.

Zircon ($ZrSiO_4$) is fed along the flow line 14 into the dissociated zircon production stage 12. In the stage 12, it is heated to a temperature in excess of 1700° C., thereby causing the crystal matrix of zircon to be destroyed, with dissociated zircon ("DZ"), which is an intimate mixture of zirconia and amorphous silica ($ZrO_2.SiO_2$), being formed.

DZ passes from the stage 12, along the transfer line 16, to the stage 18 where it is desilicated. This is accomplished by feeding gaseous HF, which can be of varying quality, through the line 20 into the stage 18, and maintaining the temperature in the stage 18 at approximately 70° C.–130° C. In this temperature range, gaseous HF reacts only with silica to form gaseous $SiF_4$, leaving behind substantially unreacted zirconia which could contain some adsorbed HF.

$SiF_4$ and $H_2O$ which are liberated in the stage are fed along the line 22 to the defluorination stage 24. In the defluorination stage 24 $SiF_4$ is reacted with steam entering along the line 26 at a temperature in excess of 900° C., to produce silica of variable quality, and HF. The silica is withdrawn along the flow line 28, while the HF is withdrawn along the flow line 30. Instead of the stage 24 comprising a plasma reactor, it may comprise a flame reactor which uses hydrogen or a hydrocarbon such as methane as fuel.

Unreacted zirconia from the stage 18 passes along the flow line 32 to the desorbing stage 34. In the stage 34, steam, entering along the flow line 36 at a temperature of approximately 500° C., is blown through the zirconia, to liberate HF, which is withdrawn along the flow line 38. Crude zirconia is withdrawn from the stage 34 along the flow line 40, and is a saleable product. Alternatively, absorbed HF could be released using a water or acid wash (not shown).

Instead, the unreacted zirconia from the stage 18 can pass along the flow line 32 into the stage 42 where it is fluorinated with HF entering along the flow line 44, preferably at a temperature below 550° C., to give a mixture of zirconium tetrafluoride and zirconium oxyfluorides, with the liberation of water vapour. The water vapour is withdrawn along the flow line 46, while the mixture of zirconium tetrafluoride and zirconium oxyfluorides is withdrawn along the flow line 48.

The mixture withdrawn from the stage 42 passes along the flow line 48 to the stage 50. Dry air enters the stage 50 along the flow line 52, at a temperature in excess of 600° C. The air acts as carrier gas which is blown through the solids in the stage 50. Zirconium tetrafluoride is swept along with the air leaving the oxyfluorides and most of the impurities behind. Whilst in the gas phase, the zirconium tetrafluoride passes through a nozzle (not shown) into which steam, entering along the flow line 54 at a temperature of approximately 600° C., is blown to form zirconia with the liberation of HF. HF is withdrawn along the flow line 60 while pure zirconia, which is a saleable product, is withdrawn along the line 58. The nozzle can be mounted in the reactor 50 or external to it.

Zirconium oxyfluorides, as well as unreacted zirconia, pass along the line 56 to the defluorination stage 62 where it is reacted with steam entering along the flow line 64. The steam is at a temperature of approximately 600° C. Zirconia is produced with the liberation of HF. The HF is withdrawn along the flow line 68, while the zirconia is withdrawn along the flow line 66. The zirconia thus produced is a crude product which can be sold.

Instead, the mixture of zirconium fluorides produced in the fluorination stage 42, can be fed along the flow line 48 to the sublimation stage 70. Dry air enters the stage 70 along the flow line 72 at a temperature in excess of 600° C. The air acts as a carrier gas which sweeps zirconium tetrafluoride from the other components, with this gaseous phase then passing along the flow line 74 to the desublimation stage 76. In the stage 76, the zirconium tetrafluoride is desublimated at a temperature lower than 500° C. This can be effected either by contacting the zirconium tetrafluoride with a cold or cooler metal surface, or by cooling it down by means of cold gas (not shown). The zirconium tetrafluoride produced in the stage 76 can be withdrawn along the flow line 78 as a saleable product which can, for example, be used for the manufacture of zirconium metal.

However, instead, the zirconium tetrafluoride produced in the stage 76 can pass to the stage 80 where it can be resublimated under vacuum or controlled reduced pressure at a temperature in excess of 600° C., for an optimum period of time, to yield high purity zirconium tetrafluoride. This product can be withdrawn along the flow line 82 to the stage 84 where it is reacted with steam entering through the flow line 86, to yield high purity zirconia. The zirconia is withdrawn along the flow line 88. HF is withdrawn along the line 89.

Zirconium oxyfluorides, or unreacted zirconia, from the stage 70, pass along the flow line 90 into the stage 92 where it is reacted with steam entering along the flow line 94, at a temperature in excess of 500° C., to produce crude zirconia which can be withdrawn along the flow line 98. HF is liberated in the stage 92, and can be withdrawn along the flow line 96.

The process 10 thus provides a facility for producing zirconium tetrafluoride and zirconia of varying quality, depending on which options are exercised as described above. Silica is obtained as a by-product. It will be appreciated that the process 10 utilizes HF recirculation, which is not shown. Thus, for example, the HF withdrawn along one or more of the flow lines 30, 38, 60, 68, 89 and 96 can be re-used in the stages 18 or 42, optionally with intermediate processing thereof.

If desired, the stages 62 and 92 and the stage 34, can be combined into a single stage (not shown).

In another embodiment of the invention, the stage 18 can be omitted, with the DZ from the stage 12 then being fed to the stage 42. In this case, the crude zirconia would not be produced in the stage 34.

In another embodiment of the invention, the stages 18, 70, 76, 80, 84 and 92 can be omitted. In this case, only a crude grade and a pure grade of zirconia would be produced.

EXAMPLE 1

In a typical laboratory scale simulation of the process 10, 0,5 kg of PDZ containing 29% undissociated zircon was subjected to fluorination at 100° C. in a laboratory scale fluidized bed with a 20% (m/m) mixture of anhydrous HF in air, for 5 hours. The following decrease in Si-content and increase in F-content was noted as a function of reaction time.

TABLE 1

THE RATE OF DESILICATION OF PDZ IN A HF\AIR MIXTURE AS A FUNCTION OF REACTION TIME

| REACTION TIME (min) | % Si | % F |
|---|---|---|
| 0 | 15,3 | 0 |
| 60 | 12,0 | 0,1 |
| 120 | 8,3 | 0,17 |
| 180 | 6,7 | 0,25 |
| 250 | 6,6 | 0,25 |
| 300 | 6,3 | 0,24 |

It should be noted that 4,4% of the residual Si can be ascribed to the presence of the 29% non-reactive undissociated zircon in the initial product. The final product therefore contained only approximately 2% Si.

EXAMPLE 2

In another laboratory scale simulation of the process 10, 0,5 kg of PDZ containing 23% undissociated zircon was subjected to fluorination at between 120° C. and 130° C. in a laboratory scale fluidized bed with a 20% in steam for 2,5 in steam for 2,5 hours. The final product contained 7,0% residual Si and 5,8% residual F.

TABLE 2

THE RATE OF DESILICATION OF PDZ IN A HF/AIR MIXTURE AS A FUNCTION OF REACTION TIME

| REACTION TIME (min) | % Si | % F |
|---|---|---|
| 0 | 16,2 | 0 |
| 90 | 13,8 | 2,0 |
| 135 | 7,0 | 5,8 |

It should be noted that 3,5% of the residual Si can be ascribed to the presence of the 23% non-reactive undissociated zircon in the initial product. The final product therefore contained only approximately 3,5% Si.

EXAMPLE 3

In yet another laboratory scale simulation of the process 10, 1 kg of PDZ containing 23% undissociated zircon was subjected to fluorination at 100° C. in a laboratory scale fluidized bed with an anhydrous HF/air mixture for 3 hours, yielding a mixture of unreacted zircon and substantially desilicated PDZ, containing approximately 15% fluorine, either as adsorbed HF or as a fluoride. After suitable acid washing and physical separation, the following analysis was obtained:

TABLE 3

THE INFLUENCE OF AN ACID WASH ON THE LEVEL OF CONTAMINANTS IN DESILICATED PDZ

| Residual Si | 1,1% (m/m) |
|---|---|
| Residual F | 0,4% (m/m) |

EXAMPLE 4

In yet another laboratory scale simulation of the process 10, 100 g of desilicated PDZ was subjected to a $HCl/HNO_3$ acid wash with the aim of reducing the level of trace element contaminants. The following results were obtained:

| ELEMENTS | BEFORE ACID WASH | AFTER ACID WASH |
|---|---|---|
| Al | 0,10% | 0,04% |
| Ca | 0,18% | 0,06% |
| Ti | 0,19% | 0,09% |
| Cr |  | 0,04% |
| Mg | 0,035% | 0,01% |
| Fe | 0,08% | 0,04% |

EXAMPLE 5

In a laboratory scale simulation of the process 10, zircon obtained under the designation "Prime Grade" from Richards Bay Minerals, was fed through a 30 kW radio frequency plasma generator at a feed rate of 1 kg/hr. Some of the resultant product was subjected to HF leach. 83% of the product dissolved indicating that 17% of the zircon did not dissociate to form plasma dissociated zircon ('PDZ').

5 kg of the PDZ product was put in a fluidized bed and treated with twice the stoichiometric equivalent of gaseous HF at 550° C. over a period of 10 hours. X-ray analyses of the resultant product indicated a mixture of zirconium oxyfluorides and tetrafluorides.

Figure 2:
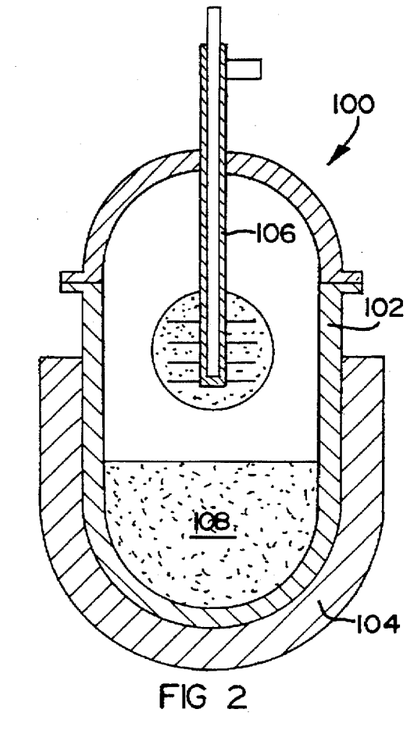
FIG. 2 shows a diagrammatic longitudinal sectional view of a vacuum sublimator/desublimator which can be used in the stage 80 of the process of FIG. 1.

The product from the fluidized bed was put in a vacuum sublimator in accordance with FIG. 2 described in more detail hereunder. The sublimator operated under vacuum at 650° C. for 16 hours. 39% of the available zirconium sublimated over during this period. The crystals formed analyzed as $ZrF_4$.

The $ZrF_4$ was reacted with steam in a muffle furnace at 600° C. X-ray analyses indicated substantially pure $ZrO_2$. This product had a uranium content of 18 ppm, and a thorium content of <3,8 ppm, compared to concentrations of 290 and 140 thereof respectively in the feed zircon.

Referring to FIG. 2, reference numeral 100 generally indicates a vacuum sublimator/desublimator which can be used in the stage 80 of the process 10 hereinbefore described with reference to FIG. 1, and which was also used in Example 5 hereinbefore described.

The vacuum sublimator/desublimator 100 comprises a cylindrical wall 102, with a heating mantle 104, which is electrically operable, provided around the lower end of the wall 102. A water-cooled vapour condensing lance 106 protrudes into the upper end of the wall 102. Means (not shown) for drawing a vacuum on the sublimator/desublimator are also supplied.

In use, a mixture 108 of $ZrF_4$ and $ZrOF_2$ is introduced into the bottom of the reactor, with the heating mantle 104 heating this mixture sufficiently to cause $ZrF_4$ to sublimate. The $ZrF_4$ then desublimates against the water-cooled lance 106.

Figure 3:
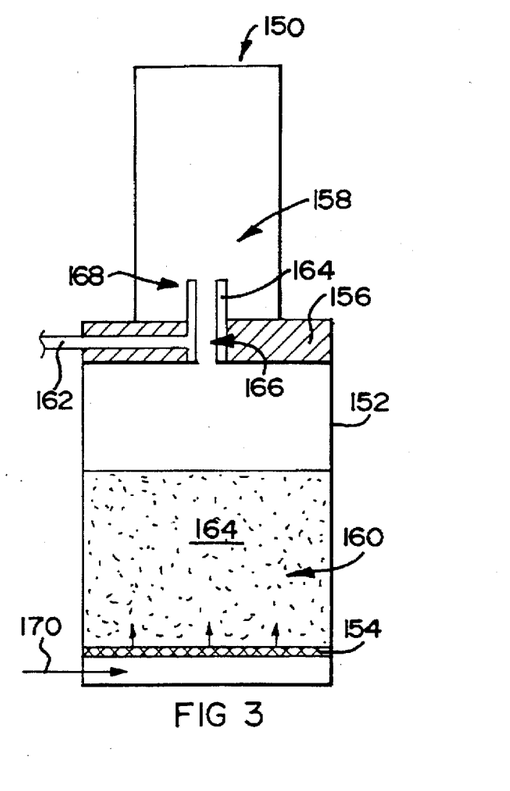
FIG. 3 shows a diagrammatic longitudinal sectional view of a fluidized bed reactor which can be used in the stage 50 of the process of FIG. 1.

Referring to FIG. 3, reference numeral 150 generally indicates a fluidized bed reactor with a steam nozzle which can be used in the stage 50 of the process 10 of FIG. 1.

The reactor 150 comprises a cylindrical wall 152, with a gas distributor 154 provided at the lower end of the wall 152. A barrier 156 divides the reactor 150 into an upper zone 158 and a lower zone 160.

A steam nozzle 168 is provided in the barrier 156. The steam nozzle 168 comprises a steam conduit 162 leading radially into the barrier 156, forming a steam jacket 164 around a central passageway 166 separating the upper zone 158 from the lower zone 160.

In use, a mixture 164 of $ZrF_4$ and $ZrOF_2$ is introduced into the lower zone 160 of the reactor where it is heated to temperatures in excess of 600° C. Dry air at temperatures in excess of 600° C. and entering the lower end of the reactor 150 at 170, is blown through the mixture sweeping the $ZrF_4$ away. In the steam nozzle 168 the $ZrF_4$ is brought in contact with superheated steam at temperatures in excess of 500° C. to produce zirconia with HF liberation. The diameter of the upper zone 158 could be designed in such a way as to retain the zirconia, or alternatively could be small enough so that the zirconia is swept out of the reactor by the gas flow.

Figure 4:
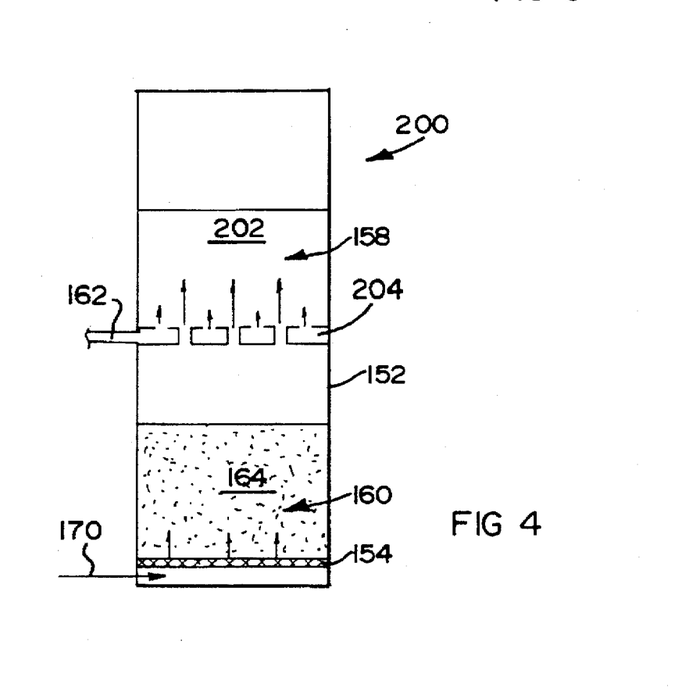
FIG. 4 shows a diagrammatic longitudinal sectional view of another fluidized bed reactor which can also be used in the stage 50 of the process of FIG. 1.

Referring to FIG. 4, reference numeral 200 generally indicates a fluidized bed reactor.

Parts of the fluidized bed reactor 200 which are the same or similar to those of the reactor 150, are indicated with the same reference numerals.

The lower zone of reactor 200 is substantially the same as that of the reactor 150 of FIG. 3. To enhance mixing of the air-$ZrF_4$ mixture with superheated steam, the top zone 158 of the reactor 200 is filled with a fluidizing medium 202, located above a gas/steam distributor 204. This fluidizing medium can be an inert material having a substantially different particle size to the zirconia which is produced by the steam reaction in order to facilitate separation thereof, or can be zirconia itself. The distributor 204 of the upper fluidized bed, distributes the carrier gas-$ZrF_4$ mixture from the bottom zone, as well as steam which is fed through steam conduit 162. Operating temperatures of reactor 200 are substantially the same as those for reactor 150.

The process of the present invention is thus based on the reaction of DZ, particularly PDZ, with gaseous HF which involves two separate reactions that can take place simultaneously or separately, depending on the reaction temperature. These reactions can be illustrated using a modified thermobalance with capabilities of handling corrosive gases such as HF gas. The extent of reaction of a solid and HF gas is manifested in a weight change that can be continuously recorded as a function of temperature and time.

Reaction of $ZrO_2$+HF $ZrO_2$ reacts with HF with a theoretical mass increase of 35.7% according to:

$$ZrO_{2(s)} + 4HF_{(g)} \rightarrow ZrF_{4(s)} + 2H_2O_{(g)} \tag{1}$$

Figure 5:
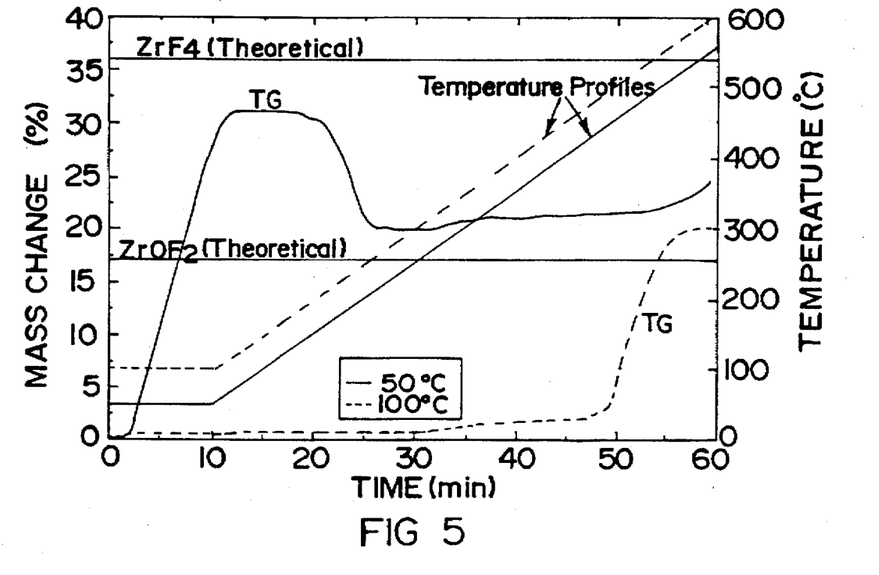
FIG. 5 shows a thermogravimetric curve of the reaction of $ZrO_2$ with HF.

A thermogravimetric curve of the reaction of $ZrO_2$ with $HF_{(gas)}$ at introduction temperatures of 50° C. and 100° C. is illustrated in FIG. 5. The heating rate is 10° C./min.

HF absorbs onto the $ZrO_2$ surface (mass increase) at 50° C. A constant mass is obtained before HF desorbs when the sample is heated. No mass increase due to HF absorption is observed when the HF is introduced to the $ZrO_2$ sample at a temperature of 100° C. A reaction is observed in the region of 450° C. The overall mass increase for the reaction is between the theoretical values for $ZrF_4$ (35,7%) and $ZrOF_2$ (17,8%). At 600° C. X-ray diffraction patterns of a mixture of zirconium oxyfluoride and $ZrF_4$ are obtained.

Reaction of $SiO_2$+HF $SiO_2$ reacts with $HF_{(gas)}$ according to:

$$SiO_{2(s)} + 4HF_{(g)} \rightarrow SiF_{4(g)} + H_2O_{(g)} \tag{2}$$

Figure 6:
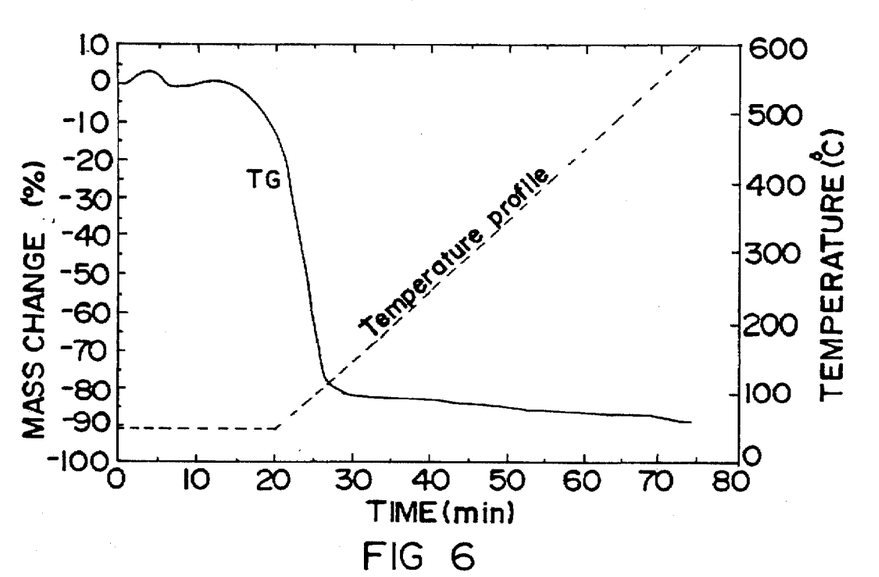
FIG. 6 shows a thermogravimetric curve of the reaction of $SiO_2$ with HF.

A thermogravimetric curve of the reaction of an impure $SiO_2$ sample with HF is illustrated in FIG. 6. The heating rate is 10° C./min. The reaction is driven to completion with the approximately 10% impurity still remaining unreacted. In this example, the sample was heated at a rate of 10° C./min after an isothermal period of 20 minutes at 50° C. The $SiO_2$ is converted to $SiF_{4(gas)}$ which is removed with the carrier gas, resulting in a mass loss.

Reaction of DZ+HF

Figure 7:
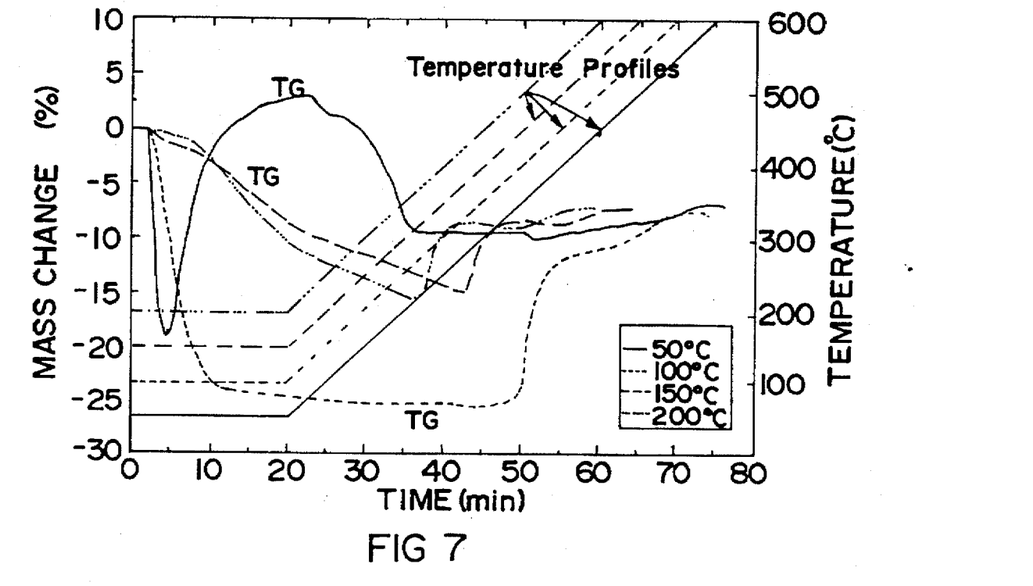
FIG. 7 shows a thermogravimetric curve of the reaction of DZ with HF.

A thermogravimetric curve of the reaction of a typical DZ sample with HF at an isothermal introduction temperature of 50° C., 100° C., 150° C. and 200° C. is illustrated in FIG. 7. The heating rate is 10° C./min.

50° C., an initial mass loss phase is observed due to the reaction of $SiO_2$ with HF to produce $SiF_{4(gas)}$ (Reaction 2). This mass loss is immediately followed by a mass increase when HF is absorbed onto the exposed $ZrO_2$ surface (similar to the mass increase in FIG. 5).

At an introduction temperature of 100° C. a mass loss due to the removal of the $SiO_2$ is observed (Reaction 2) which is followed by a mass increase at temperatures above 400° C. (Reaction 1). Only limited HF absorption is observed above 100° C.

At introduction temperatures above 100° C. reactions (2) and (1) take place simultaneously which results in a mass loss less than that observed at 100° C. but with the same overall mass loss for the reaction of approximately 7%.

Depending on the temperature DZ ($ZrO_2.SiO_2$) will react with HF according to:

(1) $(ZrO_2.SiO_2)_{(s)} + 4HF_{(g)} \rightarrow ZrO_{2(s)} + SiF4(g) + 2H_2O_{(g)}$ (Mass loss $_{(Theor)}$=32%) (3)

(2) $(ZrO_2.SiO_2) + 8HF_{(g)} \rightarrow ZrF_{4(s)} + SiF_{4(g)} + 4H_2O_{(g)}$ (Mass loss $_{(Theor)}$=8,7%) (4)

Sublimation of $ZrF_4$

This sublimation reaction can be presented as:

$$ZrF_{4(s)} \xrightarrow{(Sublimation)} ZrF_{4(g)} \xrightarrow{(Condensation)} ZrF_{4(s)} \quad (5)$$

Figure 8:
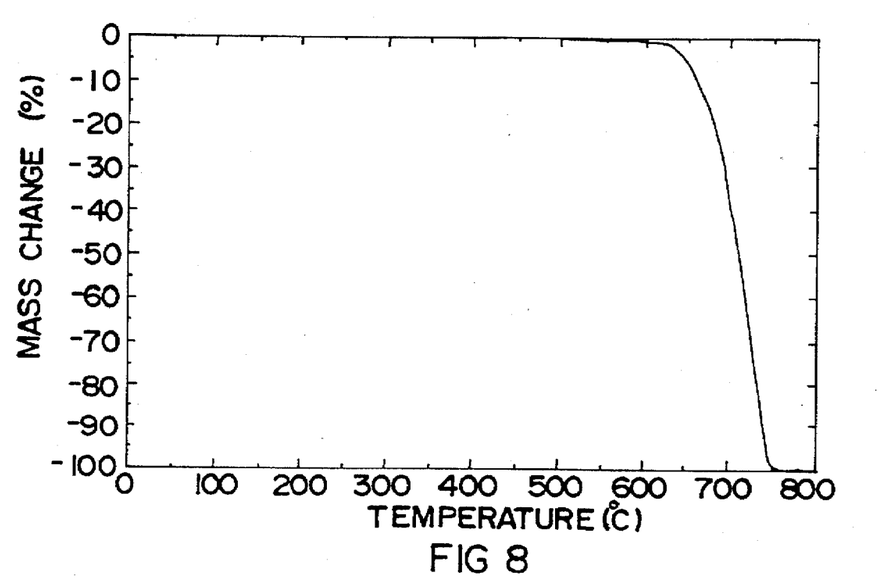
FIG. 8 shows a thermogravimetric curve of the sublimation of $ZrF_4$.

A thermogravimetric curve of the sublimation of $ZrF_4$ in a $N_2$ atmosphere is shown in FIG. 8. Sublimation of $ZrF_4$ takes place at temperatures above 600° C. at 1 atm. The heating rate is 10° C./min.

Reaction between $ZrF_4$ and $H_2O_{(steam)}$ $ZrF_4$ reacts with $H_2O_{(steam)}$ in a pyrohydrolysis reaction with a theoretical mass loss of 26% for the reaction according to:

$$ZrF_{4(s)} + 2H_2O_{(g)} \rightarrow ZrO_{2(s)} + 4HF_{(g)} \quad (6)$$

Figure 9:
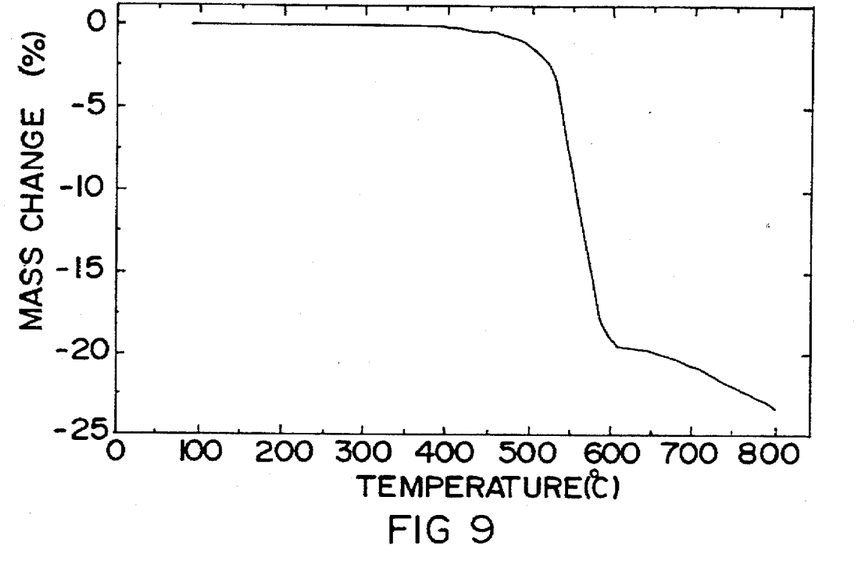
FIG. 9 shows a thermogravimetric curve of the reaction of $ZrF_4$ and $H_2O$.

A thermogravimetric curve of the reaction of $ZrF_4$ and $H_2O_{(steam)}$ is illustrated in FIG. 9. The $ZrF_4$ sample was heated at a rate of 10° C./min in a stream of air that was saturated with the vapour of $H_2O$ at 25° C. The reaction starts at about 500° C. and proceeds via an intermediate at about 600° C.

Reaction of Zirconium Oxyfluorides $$ZrO_{0.33}F_{1.33} + HF$$

Zirconium oxyfluoride ($ZrO_{0.33}F_{1.33}$) reacts with HF according to:

$$ZrO_xF_y + (4-y)HF_{(g)} \rightarrow ZrF_{4(s)} + ((4-y)/2)H_2O_{(g)} \quad (7)$$

Figure 10:
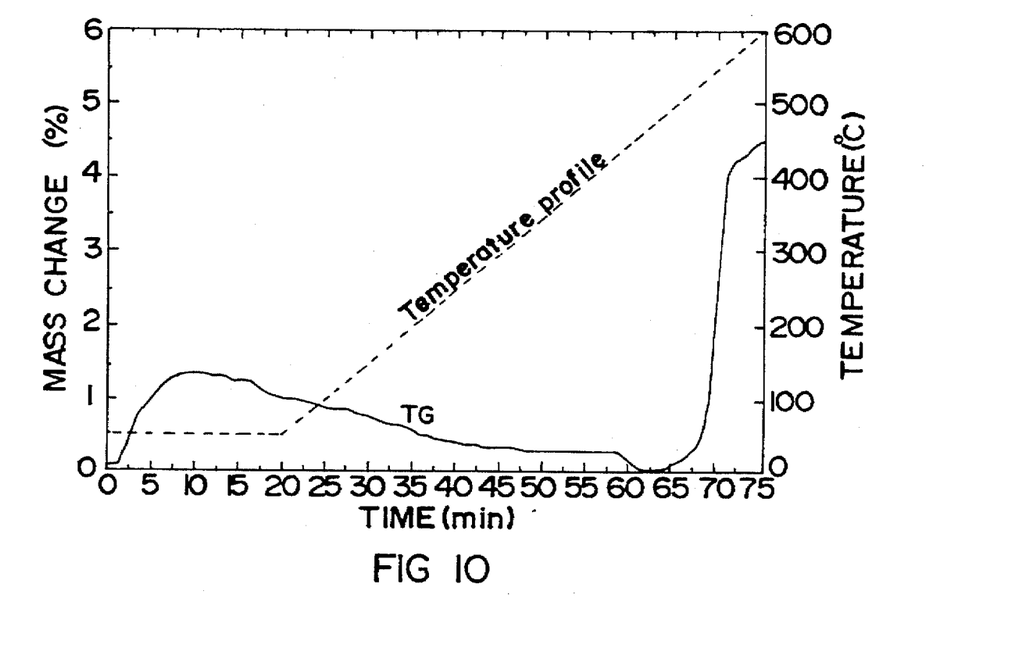
FIG. 10 shows a thermogravimetric curve of the reaction of $ZrO_{0.33}F_{1.33}$ with HF.

A thermogravimetric curve of the reaction of $ZrO_{0.33}F_{1.33}$ with HF is illustrated in FIG. 10. The heating rate is 10° C./min.

Decomposition of $ZrO_{0.33}F_{1.33}$

Zirconium oxyfluoride ($ZrO_{0.33}F_{1.33}$) decomposes according to:

$$ZrO_mF_{(4-2m)(s)} \rightarrow (m/2)ZrO_{2(s)} + ((4-2m/4)ZrF_{4(g)} \quad (m \leq 2) \quad (8)$$

Figure 11:
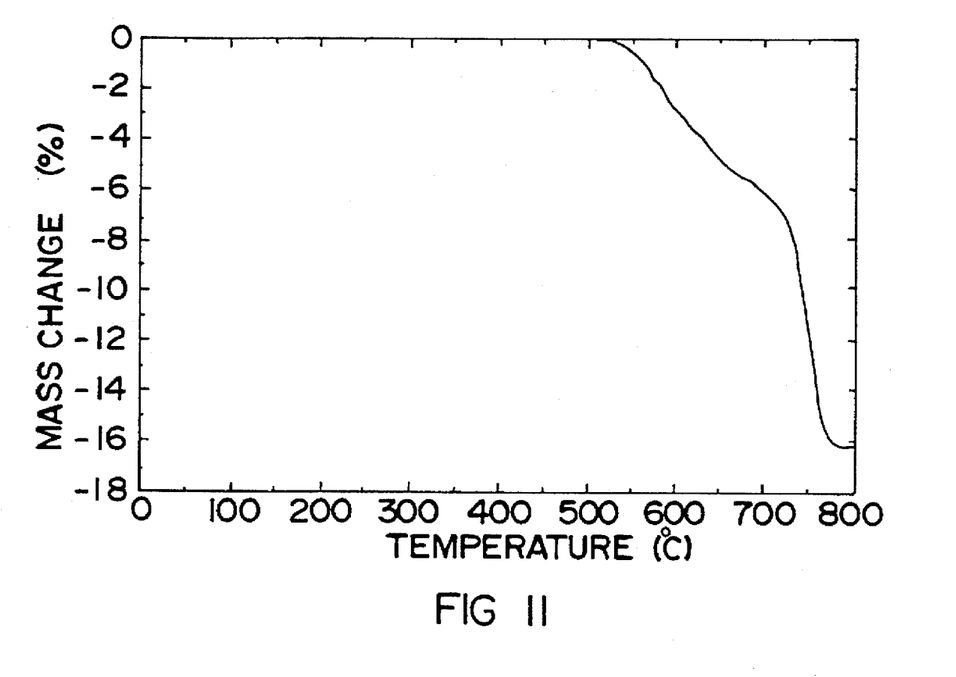
FIG. 11 shows a thermogravimetric curve of the decomposition of $ZrO_{0.33}F_{1.33}$.

A thermogravimetric curve of the decomposition of $ZrO_{0.33}F_{1.33}$ in $N_2$ is illustrated in FIG. 11. The heating rate is 10° C./min.

The process according to the invention thus utilizes the enhanced chemical reactivity of DZ, particularly PDZ, as compared to zircon, to obtain useful products by reaction with gaseous hydrogen fluoride. It is believed that, since DZ, particularly PDZ, is essentially an inexpensive precursor, its enhanced chemical reactivity will facilitate the economical manufacture of a wide range of chemical compounds therefrom.

I claim:

1. A process for reacting dissociated zircon with hydrogen fluoride, wherein the hydrogen fluoride is in gaseous form and the reaction is effected at a reaction temperature between 50° C. and 550° C., with the reaction temperature being controlled to obtain at least one zirconium-based compound selected from the group consisting of zirconium tetrafluoride, a zirconium oxide and a zirconium oxyfluoride and at least one silicon-based compound.

2. A process according to claim 1, wherein the reaction temperature is controlled at between 50° C. and 150° C. to obtain zirconia as the zirconium-based compound, and, as the silicon-based compound, gaseous silicon tetrafluoride, produced by reaction of hydrogen fluoride and silica.

3. A process according to claim 2, which includes withdrawing the silicon tetrafluoride as a gaseous stream, with the other components remaining as a residual solid phase; reacting the silicon tetrafluoride with steam at elevated temperature to yield silica and to liberate hydrogen fluoride; and recycling the liberated hydrogen fluoride for reuse in the reaction with dissociated zircon.

4. A process according to claim 2, which includes withdrawing the silicon tetrafluoride as a gaseous stream, with the other components remaining as a residual solid phase; reacting the silicon tetrafluoride in a gas or plasma flame to yield waste or fumed silica with the liberation of hydrogen fluoride; condensing or water scrubbing the liberated hydrogen fluoride; and concentrating the hydrogen fluoride for reuse in the reaction with dissociated zircon.

5. A process according to claim 3, which includes treating the residual solid phase by passing steam therethrough at a temperature above 500° C., to release hydrogen fluoride from the zirconia, and to convert any zirconium tetrafluoride and/or fluorides of impurities to zirconia and impurity oxides.

6. A process according to claim 3, which includes subjecting the residual solid phase to acid or water washing to defluorinate it.

7. A process according to claim 1, wherein the reaction temperature is controlled at between 400° C. and 550° C. to obtain, as the zirconium-based compounds, a mixture of zirconium tetrafluoride and zirconium oxyfluorides, and, as the silica-based compound, gaseous silicon tetrafluoride.

8. A process according to claim 7, which includes withdrawing the silicon tetrafluoride as a gaseous stream, with the other components remaining as a residual solid phase; reacting the silicon tetrafluoride with steam at elevated temperature to yield silica and to liberate hydrogen fluoride; and recycling the liberated hydrogen fluoride for reuse in the reaction with dissociated zircon.

9. A process according to claim 7, which includes withdrawing the silicon tetrafluoride as a gaseous stream, with the other components remaining as a residual solid phase; reacting the silicon tetrafluoride in a gas or plasma flame to yield waste or fumed silica with the liberation of hydrogen fluoride; condensing or water scrubbing the liberated hydrogen fluoride; and concentrating the hydrogen fluoride for reuse in the reaction with dissociated zircon.

10. A process according to claim 8, which includes heating the residual solid phase to a temperature above 600° C., to obtain a sublimate products phase comprising sublimated zirconium tetrafluoride, and a residual solids fraction comprising unreacted zirconia, some zirconium oxyfluorides and most of the impurities.

11. A process according to claim 10, which includes contacting the residual solids fraction with steam at a temperature above 500° C. to produce crude zirconia.

12. A process according to claim 10, which includes reacting the residual solids fraction with gaseous hydrogen fluoride, and thereafter heating the solids fraction to a temperature above 600° C., to sublimate any zirconium tetrafluoride which has formed.

13. A process according to claim 10, wherein the heating of the residual solid phase and/or the sublimate products phase to the temperature above 600° C. is effected under vacuum at an absolute pressure between the vapour pressure of zirconium tetrafluoride and the vapour pressures of any impurity fluorides present, with sublimation only being effected for the minimum period of time required to sublimate substantially all the zirconium tetrafluoride.

14. A process according to claim 10, wherein the heating of the residual solid phase and/or the sublimate products phase to the temperature above 600° C. is effected in a solids-gas contactor operating at substantially atmospheric pressure and using nitrogen or air as a carrier gas for sweeping sublimated zirconium tetrafluoride from the contactor.

15. A process according to claim 10, which includes reacting the zirconium tetrafluoride, in vapour or solid phase, with steam at a temperature above 500° C. to produce relatively pure zirconia.

16. A process according to claim 8, which includes initially raising the temperature of the residual solid phase to less than 600° C. at atmospheric pressure, so that impurities present therein are pre-sublimated; thereafter, withdrawing the sublimated impurities; and then heating the residual solid phase to a temperature above 600° C., to obtain a sublimate products phase comprising sublimated zirconium tetrafluoride.

17. A process according to claim 16, wherein the heating of the residual solid phase to the temperature above 600° C. is effected under vacuum at an absolute pressure between the vapour pressure of zirconium tetrafluoride and the vapour pressures of any impurity fluorides present, with sublimation only being effected for the minimum period of time required to sublimate substantially all the zirconium tetrafluoride.

18. A process according to claim 16, wherein the heating of the residual solid phase to the temperature above 600° C. is effected in a solids-gas contactor operating at substantially atmospheric pressure and using nitrogen or air as a carrier gas for sweeping sublimated zirconium tetrafluoride from the contactor.

19. A process according to claim 18, which includes reacting the sublimated zirconium tetrafluoride, while still in the gaseous phase, with steam at a temperature above 500° C., to produce zirconia.

20. A process according to claim 16, which includes reacting the zirconium tetrafluoride, in vapour or solid phase, with steam at a temperature above 500° C. to produce zirconia.

21. A process according to claim 2, wherein the zirconium-based compound further comprises a compound selected from the group consisting of partially reacted dissociated zircon; zirconium tetrafluoride; zirconium oxyfluoride; and mixtures thereof.

22. A process according to claim 4, further including the step of dissolving the silicon tetrafluoride in water prior to reaction with the gas or plasma flame.

23. A process according to claim 9, further including the step of dissolving the silicon tetrafluoride in water prior to reaction with the gas or plasma flame.

24. A process according to claim 10, wherein the sublimated zirconium tetrafluoride is subjected to a desublimation step to obtain desublimated zirconium tetrafluoride, the desublimated zirconium tetrafluoride in turn being resublimated.

* * * * *